United States Patent
Chan et al.

(10) Patent No.: US 8,428,381 B2
(45) Date of Patent: Apr. 23, 2013

(54) IMAGE COMPRESSION METHOD WITH VARIABLE QUANTIZATION PARAMETER

(75) Inventors: Chen-Hung Chan, Taoyuan County (TW); Hong-Long Chou, Taipei (TW)

(73) Assignee: Altek Corporation, Hsinchu (TW)

( * ) Notice: Subject to any disclaimer, the term of this patent is extended or adjusted under 35 U.S.C. 154(b) by 490 days.

(21) Appl. No.: 12/793,835

(22) Filed: Jun. 4, 2010

(65) Prior Publication Data

US 2011/0299790 A1    Dec. 8, 2011

(51) Int. Cl.
*G06K 9/00*    (2006.01)

(52) U.S. Cl.
USPC ........................................................ 382/251

(58) Field of Classification Search ........... 382/251–253
See application file for complete search history.

(56) References Cited

U.S. PATENT DOCUMENTS

| | | | | |
|---|---|---|---|---|
| 5,260,782 A | * | 11/1993 | Hui | 375/240.15 |
| 5,414,795 A | * | 5/1995 | Tsutsui et al. | 704/204 |
| 5,583,803 A | * | 12/1996 | Matsumoto et al. | 708/401 |
| 5,708,511 A | * | 1/1998 | Gandhi et al. | 382/239 |
| 7,743,400 B2 | * | 6/2010 | Kurauchi | 725/114 |
| 2003/0103573 A1 | * | 6/2003 | Woo et al. | 375/245 |
| 2005/0259884 A1 | * | 11/2005 | Murakami et al. | 382/252 |
| 2008/0226183 A1 | * | 9/2008 | Lei et al. | 382/238 |
| 2009/0202164 A1 | * | 8/2009 | Rossato et al. | 382/238 |
| 2009/0244307 A1 | * | 10/2009 | Nagaishi et al. | 348/222.1 |

* cited by examiner

*Primary Examiner* — Jingge Wu
(74) *Attorney, Agent, or Firm* — Morris Manning & Martin LLP; Tim Tingkang Xia, Esq.

(57) ABSTRACT

An image compression method s used for processing a plurality of pixels of an image. The image compression method includes the steps of receiving N successive pixels; obtaining N pixel differences and N map differences corresponding to the N pixels according to values of the N pixels through differential pulse code modulation; calculating to obtain a quantization reference value corresponding to the N pixels according to the N pixel differences; obtaining a quantization parameter corresponding to the N pixels according to the quantization reference value; and encoding the N map differences according to the quantization parameter.

8 Claims, 8 Drawing Sheets

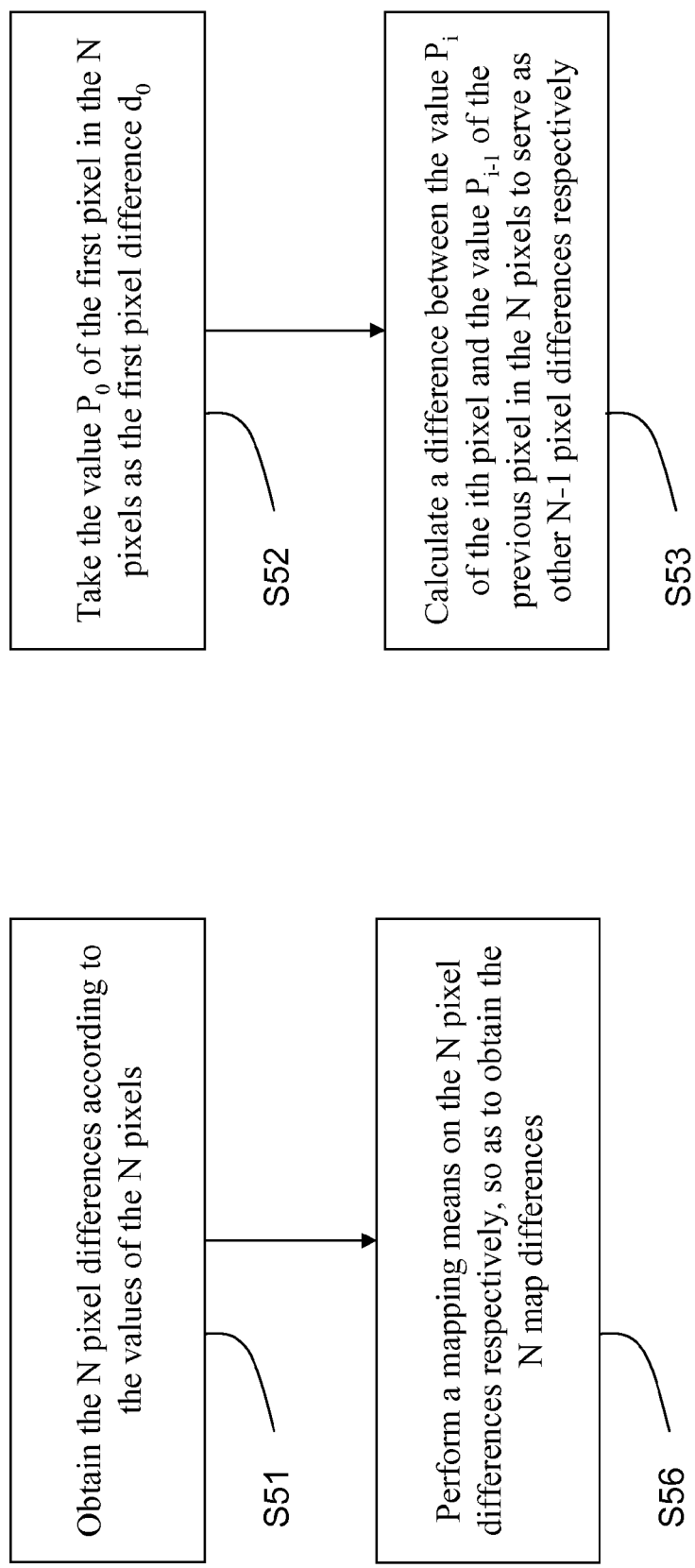

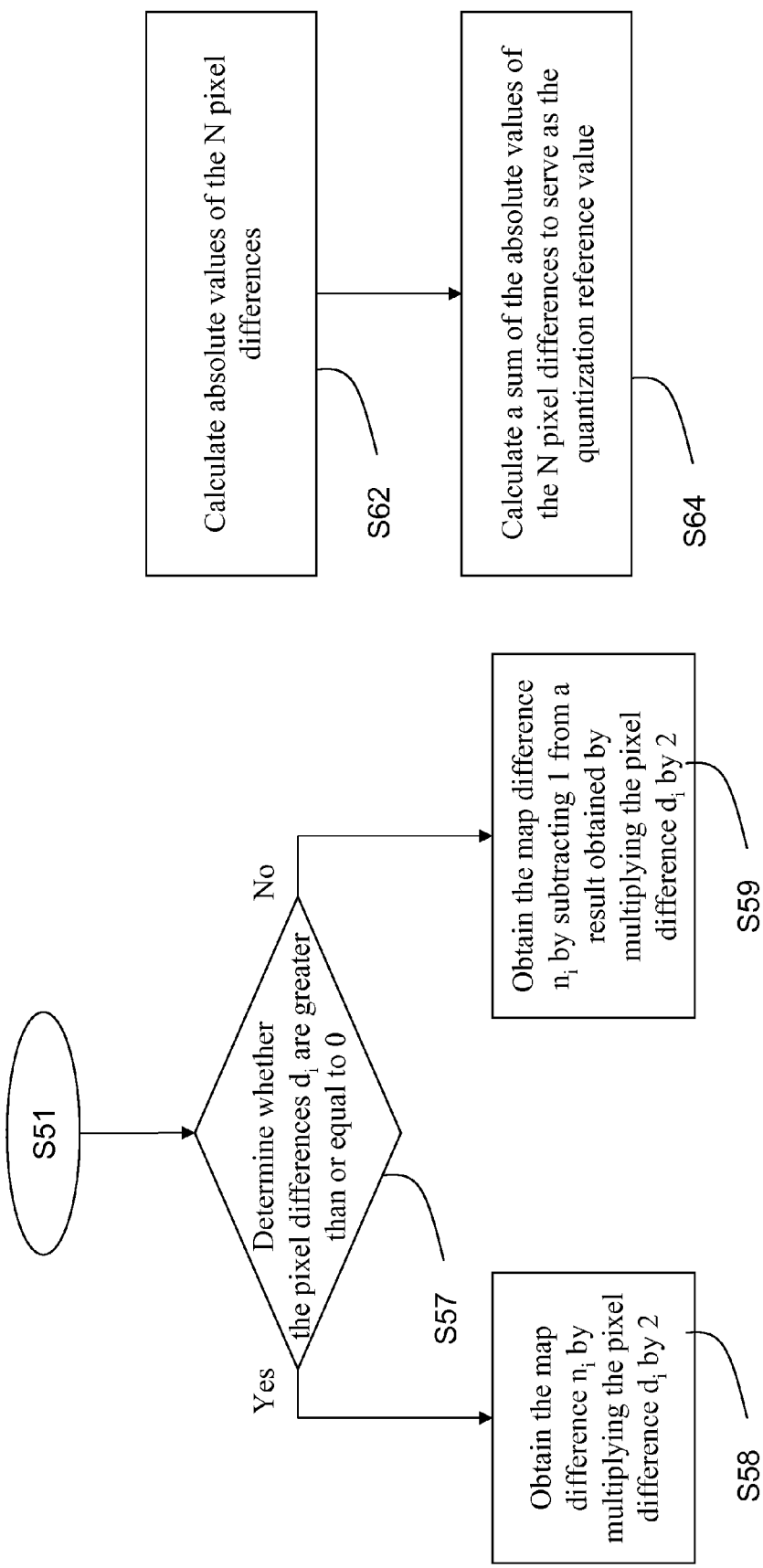

IMAGE COMPRESSION METHOD WITH VARIABLE QUANTIZATION PARAMETER

BACKGROUND OF THE INVENTION

1. Field of Invention

The present invention relates to an image compression method with a variable quantization parameter, and more particularly to an image compression method with a variable quantization parameter which requires less memory space.

2. Related Art

Along with the progress in electronic and information technologies, the technology of processing and displaying images on computers or various electronic devices has developed to be more and more popular. The early electronic information technologies can only store or process low-pixel digital images. Now, people long for high-quality images with more and more demands. In order to obtain high-quality images, a lossless compression method is often employed for image compression. However, a high-quality image generally has a large file size and cannot be stored and propagated conveniently. In this regard, experts in image processing have developed a lossy compression technology, which discards some information of an image to reduce the file size. For example, Joint Photographic Experts Group (JPEG) is the best known lossy compression format.

Lossy compression usually discards some data by means of quantization, and further includes two methods as using a single quantization parameter and using non-uniform quantization parameters. The method of using a single quantization parameter is to quantize all images or all blocks of one image with the same quantization parameter. Thus, the conventional image compression method using a single quantization parameter has a problem that the quantization parameter is not applicable to all images or all blocks in one image. The conventional image compression method using non-uniform quantization parameters emphasizes low-frequency parts in images, so as to represent the low-frequency parts with almost all bits during encoding. However, such method loses most of medium- and high-frequency images visible to human eyes, for example, parts with complex picture composition, with the result that the lost image looks unnatural.

Moreover, some conventional encoders adopt a prediction method such as context modeling, which needs to at least buffer a whole row of pixels of an image so as to perform prediction in various modes. Therefore, the conventional encoders require a large amount of storage space, resulting in an increased cost thereof.

Furthermore, request of users for higher and higher image resolutions aggravates the burden on image compression. If a conventional compression method is adopted, once the image resolution is raised, the encoder needs to consume a larger amount of storage space to store a whole row of pixels in an image for image compression. In other words, the conventional image compression method has the problems that a single quantization parameter is unsuitable for a whole image, medium- and high-frequency information in an image is discarded excessively due to non-uniform quantization parameters, and large buffer space is required.

SUMMARY OF THE INVENTION

In one aspect, the present invention relates to an image compression method with a variable quantization parameter for processing a plurality of pixels of an image. The image compression method with the variable quantization parameter comprises: receiving N successive pixels; obtaining N pixel differences and N map differences corresponding to the N pixels according to values of the N pixels through a differential pulse code modulation (DPCM) means; calculating to obtain a quantization reference value corresponding to the N pixels according to the N pixel differences; obtaining the quantization parameter corresponding to the N pixels according to the quantization reference value; and encoding the N map differences according to the quantization parameter.

In order to compress the whole image, the image compression method with the variable quantization parameter may further comprise: continuously receiving and encoding the other pixels of the image in a unit of N till all the pixels of the image are compressed.

The step of calculating to obtain a quantization reference value corresponding to the N pixels according to the N pixel differences may comprise: calculating absolute values of the N pixel differences; and calculating a sum of the absolute values of the N pixel differences to serve as the quantization reference value.

According to an embodiment of the present invention, the quantization parameter may be $\log_2(err\_sum/16)$, where err_sum is the quantization reference value. The quantization reference value represents a sum of the N map differences.

Preferably, N is a positive integer greater than or equal to 2 and is smaller than an image width of the image. The image compression method with the variable quantization parameter can be performed by a microprocessor.

To sum up, in the image compression method with the variable quantization parameter, N pixels in the image are received, and the quantization parameter suitable for the N pixels are obtained according to pixel differences for encoding. The quantization parameter is based on the image complexity of the N pixels (which also can be regarded as the high and low frequency characteristics of the N pixels). Therefore, the suitable quantization parameter can be obtained for every N pixels in the image. A buffer of the encoder only needs to store values of the N pixels during compression, so that a large amount of buffer space is saved.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein:

FIG. 4 is a flow chart of a DPCM means according to an embodiment of the present invention;

FIG. 5 is a flow chart of Step S51 according to an embodiment of the present invention;

FIG. 6 is flow chart of Step S56 according to an embodiment of the present invention;

FIG. 7 is a flow chart of Step S60 according to an embodiment of the present invention;

DETAILED DESCRIPTION OF THE INVENTION

The present invention provides an image compression method with a variable quantization parameter, for processing a plurality of pixels of an image to compress the image. The image compression method with the variable quantization parameter can assign a suitable quantization parameter to a part of pixels in the image according to characteristics thereof, so as to retain features of the image appropriately. The image compression method with the variable quantization parameter can be implemented in an encoder, and can be performed by a microprocessor.

Figure 1:
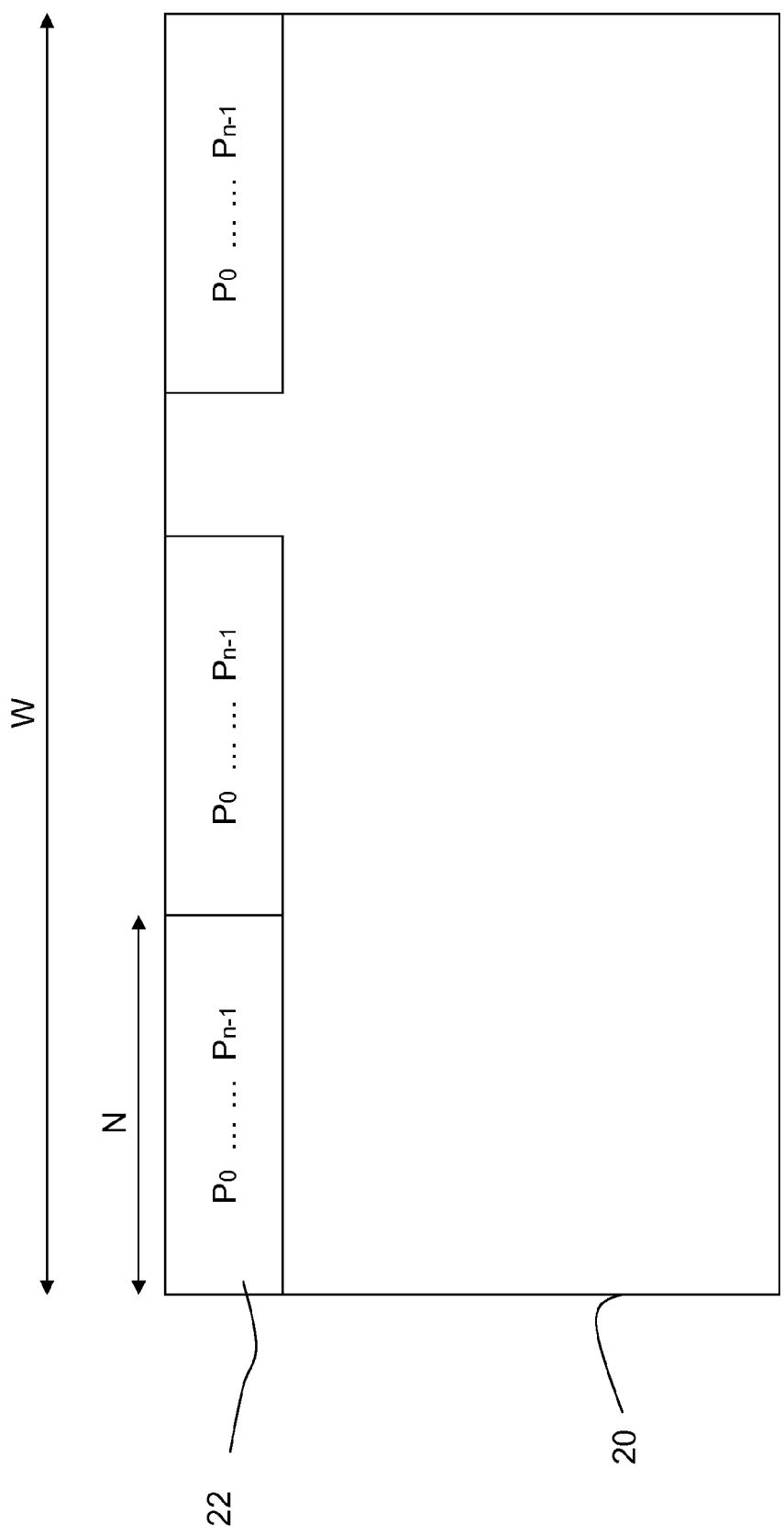
FIG. 1 is a schematic view of an image according to an embodiment of the present invention.

FIG. 1 is a schematic view of an image according to an embodiment of the present invention.

Referring to FIG. 1, an image 20 has W×L pixels, where W is an image width and L is an image length of the image 20. For example, the image 20 may have 640×480 pixels or 128×128 pixels, and the image width W is 640 (pixels) or 128 (pixels). The pixels in the same row of the image 20 have strong correlation with each other, which can be utilized for image compression.

The image compression method with the variable quantization parameter can select N pixels once and buffer them for processing. The step of selecting the N successive pixels can be implemented with a processing window 22. The processing window 22 has a length of N, and the N pixels selected by the processing window 22 are N pixels processed by the image compression method with the variable quantization parameter.

Figure 2:
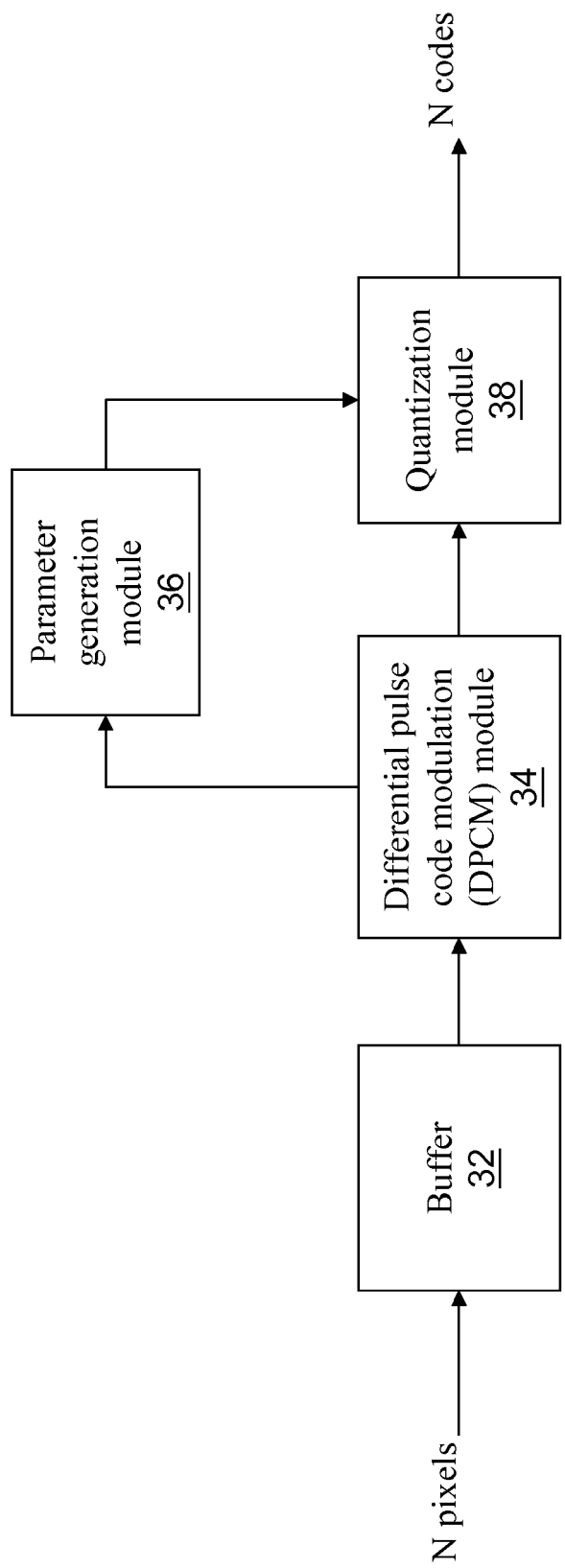
FIG. 2 is a schematic view of an encoder according to an embodiment of the present invention.
Figure 3:
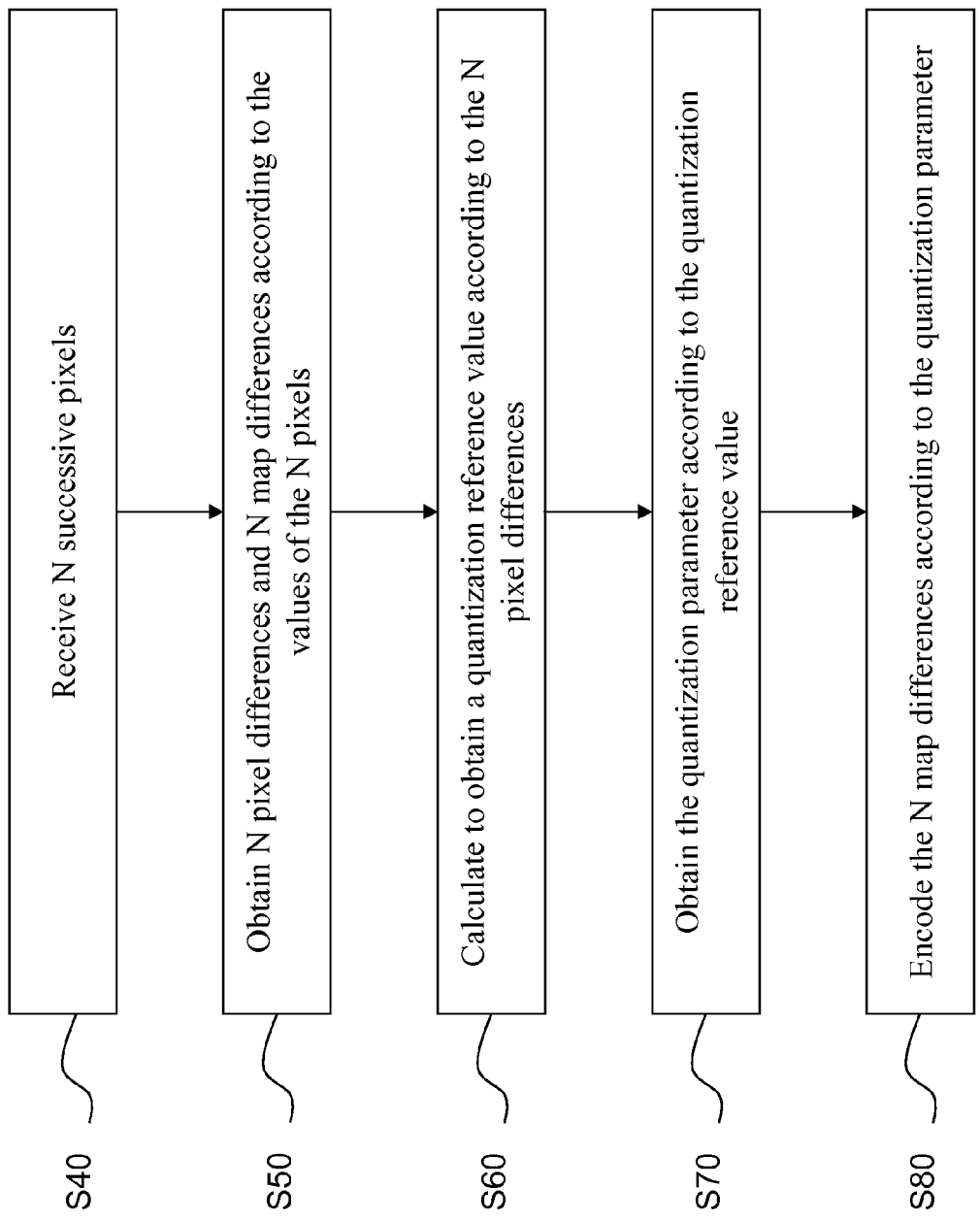
FIG. 3 is a flow chart of an image compression method with a variable quantization parameter according to an embodiment of the present invention.

FIGS. 2 and 3 are respectively a schematic view of an encoder and a flow chart of an image compression method with a variable quantization parameter according to an embodiment of the present invention.

As shown in FIG. 2, the encoder may comprise a buffer 32, a differential pulse code modulation (DPCM) module 34, a parameter generation module 36, and a quantization module 38.

In the image compression method with the variable quantization parameter, firstly, N successive pixels are received (Step S40). N successive pixels may be selected from the image 20 and stored in the buffer 32, and then the DPCM module 34 receives the N pixels form the buffer 32 during processing. More specifically, the image 20 may be a file stored in a memory (not shown), or image data transmitted by a photosensitive unit of an image capturing device. Therefore, after the N successive pixels are selected from the image 20 received by the memory or the photosensitive unit, values of the N pixels $P_0$–$P_{N-1}$ can be received directly by the buffer 32.

Therefore, when the image 20 is compressed by the image compression method with the variable quantization parameter, only the N pixels of the processing window 22 are used, and the other pixels in the image 20 are not required. Therefore, the buffer 32 of the encoder also only needs to store the N pixels, instead of the W pixels in the whole row of the image 20.

N is a positive integer greater than or equal to 2, and is smaller than the image width W. In order to perform the image compression method with the variable quantization parameter more efficiently, N may be a value by which the image width W is divisible. In other words, the image width W of the image 20 is exactly divisible by N. For example, when the image width W is 128 (pixels), N can be 16.

After the N pixels are received, the DPCM module 34 performs a DPCM means on the N pixels, so as to obtain N map differences $n_0$–$n_{N-1}$ corresponding to the N pixels according to the values of the N pixels $P_0$–$P_{N-1}$ (Step S50). The values of the pixels $P_0$–$P_{N-1}$ may be, for example, grayscale values, RGB values, or hue, saturation, and lightness of an HSL color space. The image compression method with the variable quantization parameter does not limit the content of the values of the pixels.

FIG. 4 is a flow chart of the DPCM means according to an embodiment of the present invention. Referring to FIG. 4, in the image compression method with the variable quantization parameter, the N map differences $n_0$–$n_{N-1}$ corresponding to the processing window 22 are obtained by the DPCM means, so as to perform compression. According to the DPCM means, N pixel differences $d_0$–$d_{N-1}$ respectively corresponding to the N pixels are obtained according to the values of the N pixels $P_0$–$P_{N-1}$ (Step S51). Then, a mapping means is performed on the N pixel differences respectively, so as to obtain the N map differences $n_0$–$n_{N-1}$ respectively corresponding to the N pixel differences (Step S56).

FIGS. 5 and 6 are respectively a flow chart of Step S51 and a flow chart of the mapping means in Step S56 according to an embodiment of the present invention.

Referring to FIGS. 4, 5, and 6, in Step S51, the pixel differences $d_0$–$d_{N-1}$ can be calculated and obtained according to Formulas 1 and 2:

$$d_0 = P_0 - p \qquad \text{Formula 1}$$

$$d_i = P_i - P_{i-1}, \text{ where } 0 < i < N, \text{ and } i \text{ is a positive integer} \qquad \text{Formula 2}$$

where $P_0$ is a value of the first pixel in the N pixels in the processing window 22, $P_i$ is a value of the $i^{th}$ pixel in the N pixels in the processing window 22, $d_0$ is the pixel difference corresponding to $P_0$, and $d_i$ is the pixel difference corresponding to $P_1$.

In Formula 1, the value $P_0$ of the first pixel in the N pixels is taken as the first pixel difference $d_0$ (Step S52). In Formula 2, a difference between the value $P_i$ of the $i^{th}$ pixel and the value $P_{i-1}$ of the previous pixel in the N pixels is calculated as other N–1 pixel differences $d_1$–$d_{N-1}$ respectively, where $0<i<N$ (Step S53). In other words, the pixel differences $d_1$–$d_{N-1}$ are obtained by subtraction between the values $P_0$–$P_{N-1}$ of the adjacent pixels.

According to another embodiment of the present invention, a value of a previous pixel $P_{-1}$ of the first pixel in the processing window 22 of the image 20 can be stored, and thus, the value of the first pixel difference $d_0$ is the difference between $P_0$ and $P_{-1}$.

After the pixel differences $d_0$–$d_{N-1}$ corresponding to the processing window 22 are obtained in Step S51, the mapping means can firstly determine whether the pixel differences $d_i$ are greater than or equal to 0 one by one (Step S57), and then calculate to obtain the map differences $n_0$–$n_{N-1}$ according to Formulas 3 and 4:

$$n_i = 2 \times d_i, \text{ if } d_i \geq 0 \qquad \text{Formula 3}$$

$$n_i = 2 \times d_i - 1, \text{ if } d_i < 0 \qquad \text{Formula 4}$$

where $n_i$ is a value of the $i^{th}$ pixel in the N map differences $n_0$–$n_{N-1}$, and $0 \leq i < N$.

For the pixel difference $d_i$ greater than or equal to 0, in Formula 3, a value obtained by multiplying the pixel difference $d_i$ by 2 is taken as the map difference That is to say, the map difference $n_i$ is obtained by multiplying the pixel difference $d_i$ by 2 (Step S58). For the pixel difference $d_i$ smaller than 0, in Formula 4, a value obtained by subtracting 1 from a result obtained by multiplying the pixel difference $d_i$ by 2 is taken as the map difference $n_i$. That is to say, the map difference $n_i$ is obtained by subtracting 1 from a result obtained by multiplying the pixel difference $d_i$ by 2 (Step S59).

In this way, the N map differences $n_0$–$n_{N-1}$ corresponding to the N pixels can be obtained according to the values $P_0$–$P_{N-1}$ of the N pixels in Step S50.

Referring to FIG. 3 again, the parameter generation module 36 of the encoder can calculate to obtain a quantization reference value corresponding to the N pixels according to the N pixel differences $d_0$–$d_{N-1}$, and transmit the quantization reference value to the quantization module 38 (Step S60). FIG. 7 is a flow chart of Step S60 according to an embodiment of the present invention.

Referring to FIG. 7, the image compression method with the variable quantization parameter can obtain the quantization reference value according to a difference degree between two adjacent pixels in the N pixels being processed. In other words, the quantization reference value is obtained according to the image complexity of the N pixels. Therefore, absolute values $|d_0|$–$|d_{N-1}|$ of the N pixel differences can be calculated firstly (Step S62), and then a sum of the absolute values $|d_0|$–$|d_{N-1}|$ of the N pixel differences is calculated as the quantization reference value (Step S64). According to the quantization reference value, the image compression method with the variable quantization parameter can obtain the quantization parameter corresponding to the N pixels (Step S70).

According to an embodiment of the present invention, the quantization parameter is log2(err_sum/16), where err_sum is the quantization reference value. The quantization reference value represents a sum of the N map differences. According to another embodiment of the present invention, the quantization parameter may be log2(err_sum/N).

According to the above calculation method, it is known that, the quantization reference value can represent the complexity of the N pixels. The higher the quantization reference value is, the more variations the part of the image of the N pixels will have. That is to say, the N pixels are the part of the image having many high and medium frequency characteristics after being converted into values in the frequency domain. Therefore, the quantization parameter capable of maintaining many high and medium frequency characteristics should be assigned to the N pixels having a high quantization reference value.

Then, the quantization module 38 can encode the N map differences according to the quantization parameter (Step S80).

Figure 8A:
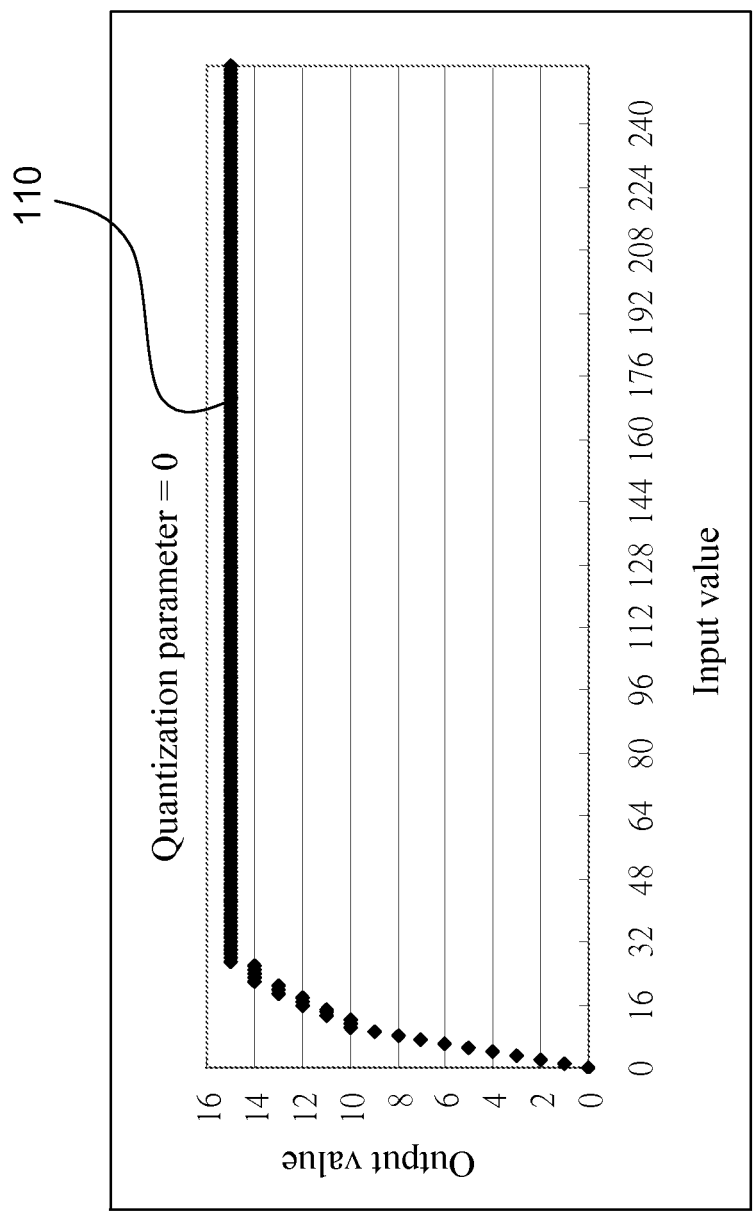
FIG. 8A is a schematic view of a quantization parameter according to an embodiment of the present invention.
Figure 8B:
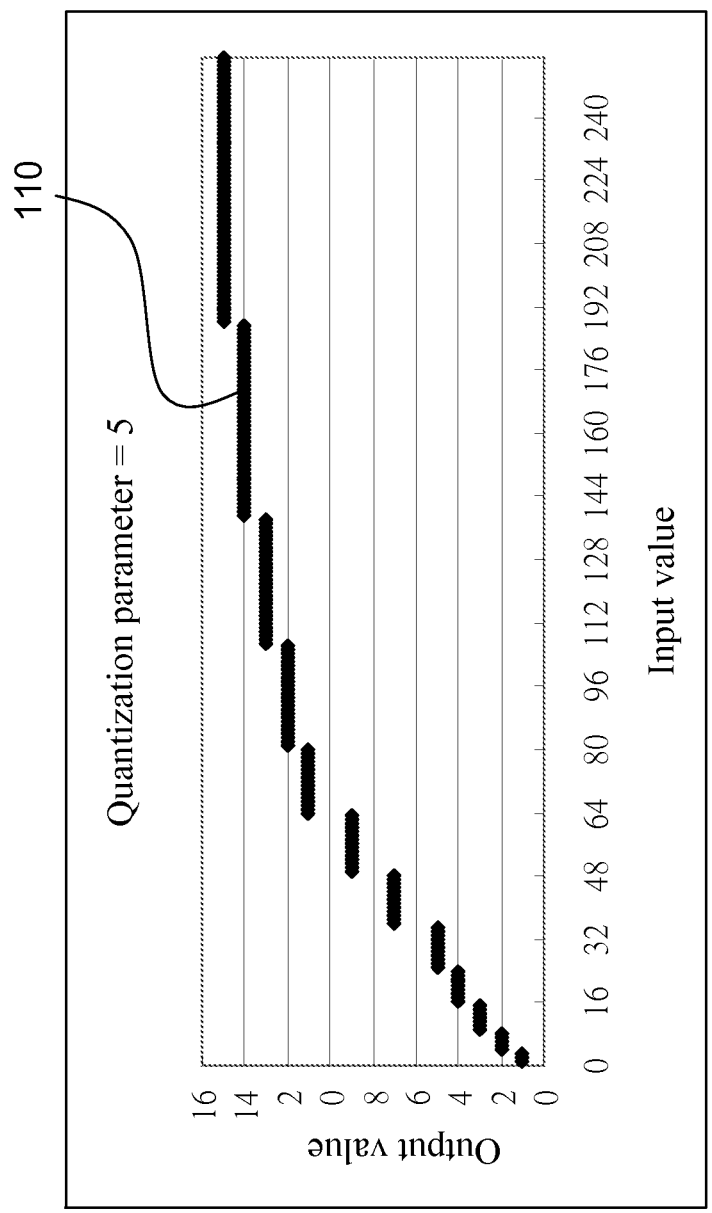
FIG. 8B is a schematic view of a quantization parameter according to another embodiment of the present invention.

FIGS. 8A and 8B are respectively schematic views of the quantization parameter according to different embodiments of the present invention. Referring to FIGS. 8A and 8B, an input output curve 110 represents the conditions of input and output values when the quantization parameter is 0 and 5.

When the quantization parameter is 0, it represents that the quantization reference value is very low. That is to say, the values of the N pixels are close to each other, and the absolute values $|d_0|$–$|d_{N-1}|$ of the N pixel differences are all low. Therefore, during the quantization, a high-precision representation space is assigned to the low input values (i.e., the low-frequency part after conversion), and the variations in the medium- and high-frequency parts are greatly omitted. In contrast, when the quantization parameter is 5, it represents that the adjacent pixels in the N pixels are significantly different, so the image complexity of the N pixels is relatively high. A representation space for the low frequency, medium frequency, and high frequency is reserved during the quantization, so as to record the map differences close to the fact.

Figure 9:
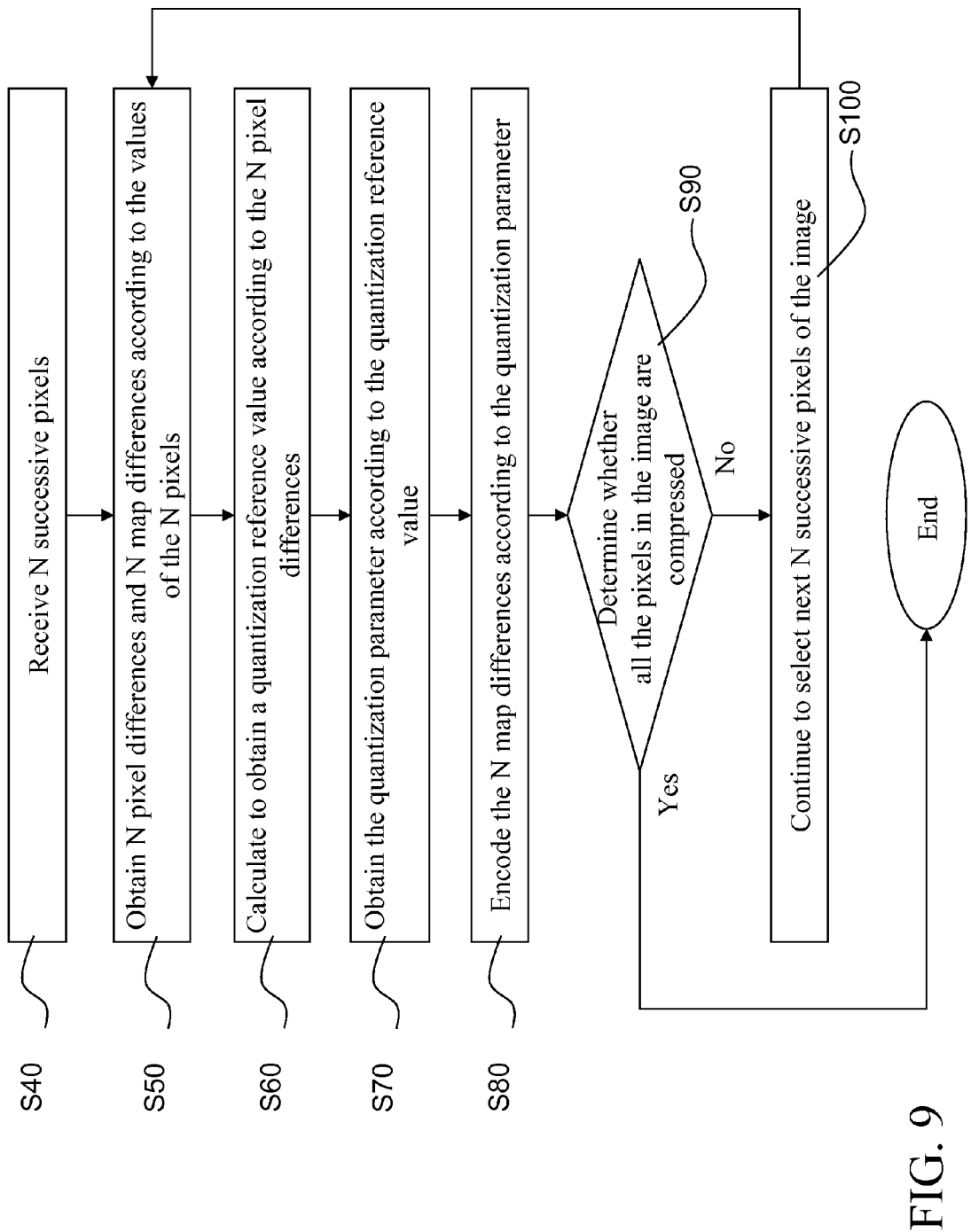
FIG. 9 is a flow chart of an image compression method with a variable quantization parameter according to another embodiment of the present invention.

After quantization and encoding, the values $P_0$–$P_{N-1}$ of the N pixels in the processing window 22 are compressed into lossless codes $c_0$–$c_{N-1}$. The whole image 20 can be compressed by the image compression method with the variable quantization parameter. FIG. 9 is a flow chart of an image compression method with a variable quantization parameter according to another embodiment of the present invention.

Referring to FIG. 9, after Steps S40 to S80 are performed to compress the N pixels of the processing window 22, it can be determined whether all the pixels in the image 20 are compressed (Step S90). If the image 20 has not been completely compressed, selection of next N successive pixels of the image 20 is continued (Step S100), and the N pixels selected in Step S100 are processed according to Steps S50, S60, S70, and S80. If all the pixels of the image 20 are encoded, i.e., the image 20 has been compressed into a compressed image file, the process can be ended.

In other words, the lossless image compression method continues to select additional N pixels subsequent to the N pixels selected in Step S40, and processes the additionally selected N pixels as a new processing window 22.

To sum up, in the image compression method with the variable quantization parameter according to the present invention, N pixels in the image are received, and N pixel differences corresponding to the N pixels are obtained through a DPCM means. The quantization parameter suitable for the N pixels can be obtained according to the N pixel differences and used for encoding. Since the quantization parameter is selected according to the image complexity of the N pixels, the suitable quantization parameter can be obtained for every N pixels in the image. Since it is unnecessary to use the other pixels in the image during compression, the buffer of the encoder only needs to store values of the N pixels, so that a large amount of buffer space is saved.

What is claimed is:

1. An image compression method with a variable quantization parameter, for processing a plurality of pixels of an image, the method comprising:
  receiving N successive pixels;
  obtaining N pixel differences and N map differences corresponding to the N pixels according to values of the N pixels through a differential pulse code modulation (DPCM) means, wherein the DPCM means comprises:
    obtaining the N pixel differences respectively corresponding to the N pixels according to the values of the N pixels; and
    performing a mapping means on the N pixel differences respectively, so as to obtain the N map differences respectively corresponding to the N pixel differences, wherein the mapping means further comprises: when the $i^{th}$ pixel difference $d_i$ in the N pixel differences is greater than or equal to 0, obtaining the corresponding $i^{th}$ map difference $n_i$ by multiplying the pixel difference di by 2, where $0 \leq i < N$; and when the $i^{th}$ pixel difference $d_i$ in the N pixel differences is smaller than 0, obtaining the corresponding $i^{th}$ map difference $n_i$ by subtracting 1 from a result obtained by multiplying the pixel difference $d_i$ by 2;

calculating to obtain a quantization reference value corresponding to the N pixels according to the N pixel differences;

obtaining a quantization parameter corresponding to the N pixels according to the quantization reference value; and encoding the N map differences according to the quantization parameter.

2. The image compression method with the variable quantization parameter according to claim 1, further comprising:

continuously receiving and encoding the other pixels of the image in a unit of N till all the pixels of the image are compressed.

3. The image compression method with the variable quantization parameter according to claim 1, wherein N is a positive integer greater than or equal to 2, and is smaller than an image width of the image.

4. The image compression method with the variable quantization parameter according to claim 1, wherein the step of calculating to obtain the quantization reference value corresponding to the N pixels according to the N pixel differences comprises:

calculating absolute values of the N pixel differences; and calculating a sum of the absolute values of the N pixel differences to serve as the quantization reference value.

5. The image compression method with the variable quantization parameter according to claim 1, wherein the quantization parameter is $\log_2$ $$\log_2\left(\frac{\text{Quantization reference value}}{16}\right).$$

6. The image compression method with the variable quantization parameter according to claim 1, wherein the step of obtaining the N pixel differences respectively corresponding to the N pixels according to the values of the N pixels comprises:

taking a value $P_0$ of the first pixel in the N pixels as the first pixel difference $d_0$; and calculating a difference between a value $P_i$ of the $i^{th}$ pixel and a value $P_{i-1}$ of the previous pixel in the N pixels to serve as other N−1 pixel differences respectively, where i is a positive integer, and $0 < i < N$.

7. The image compression method with the variable quantization parameter according to claim 1, performed by a microprocessor.

8. An image compression method with a variable quantization parameter, for processing a plurality of pixels of an image, the method comprising:

receiving N successive pixels;

obtaining N pixel differences and N map differences corresponding to the N pixels according to values of the N pixels through a differential pulse code modulation (DPCM) means;

calculating to obtain a quantization reference value corresponding to the N pixels according to the N pixel differences;

obtaining a quantization parameter corresponding to the N pixels according to the quantization reference value; and encoding the N map differences according to the quantization parameter, wherein the quantization parameter is $$\log_2\left(\frac{\text{Quantization reference value}}{16}\right).$$

* * * * *